3,158,658
PRODUCING A PHOSPHORUS FLUORIDE CONTAINING GAS AND REACTION THEREOF WITH CARBON
Meyer M. Markowitz, Ardmore, Pa., assignor to Foote Mineral Company, Philadelphia, Pa., a corporation of Pennsylvania
No Drawing. Filed June 8, 1961, Ser. No. 115,599
7 Claims. (Cl. 260—653)

This invention relates to a phosphorus fluoride containing gas, and more particularly, provides novel processes for producing a phosphorus fluoride containing gas.

The phosphorus fluorides are useful for a variety of purposes, and in particular as fluorinating agents. Methods which have been known hitherto for the preparation of phosphorus fluorides such as the standard preparation method for phosphorus pentafluoride, comprising the reaction of phosphorus pentachloride with arsenic tri- or pentafluoride, however, are expensive and extremely hazardous, which limits their use.

In general, the normal metal fluoride salts, as compared to fluorides of non-metals like phosphorus, are relatively inert and non-volatile. It is often difficult to remove unwanted fluorine from a composition containing a metal fluoride, partly because of the fact that such metal fluorides are relatively non-volatile, while their inertness makes it difficult to convert them to a form which can readily be recovered from the composition.

Phosphorus compounds similary sometimes occur in compositions in a higher concentration than is desired, presenting the problem of removal of phosphorus therefrom. A method of reducing the phosphorus content of a composition in which the phosphorus is removed as a volatile compound from the reaction mixture would be particularly desirable, as simplifying the phosphorus removal procedure.

It is an object of this invention to provide novel processes producing a phosphorus fluoride containing gas.

A particular object of this invention is to provide a novel improved and particularly advantageous method for the synthesis of a phosphorus fluoride containing gas.

Another object is to provide a novel method for the removal of unwanted fluorine from a composition containing the same.

Another object is to provide a novel method for reducing the amount of phosphorus in a composition containing the same.

Another object is to provide a novel method for converting an alkali metal phosphate to a less highly condensed phosphate.

These and other objects will become evident from a consideration of the following specification and claims.

The novel processes provided by this invention, expressed broadly, comprise the reaction of an alkali metal fluoride with an alkali metal phosphate. More particularly, these novel processes comprise heating an alkali metal fluoride with an alkali metal phosphate at a temperature and for a time sufficient to produce a substantial decrease in the combined weight of said fluoride and phosphate in the reaction mixture by evolution of a phosphorus fluoride containing gas therefrom.

The alkali metal phosphates which have been found to react with an alkali metal fluoride in accordance with this invention to produce a phosphorus fluoride containing gas are phosphates in which the ratio of alkali metal oxide to phosphorus pentoxide is equal to 2 or less.

The discovery has now been made that heating such a phosphate with an alkali metal fluoride produces a phosphorus fluoride containing gas. This is surprising, since the alkali metal fluorides are essentially unreactive under the same conditions with less condensed phosphates such as an orthophosphate. The phosphorus fluoride content of the gas appears to be predominantly phosphorus oxyfluoride. There are indications that some phosphorus pentafluoride is also present.

Moreover, it has been discovered, the phosphates of the stated type enhance the reactivity of the alkali metal fluoride with the moisture of the air, whereby hydrogen fluoride is evolved. Thus when the heating is conducted in air of normal moisture content, the gas evolved may contain one or more phosphorus fluorides and also hydrogen fluoride. This is surprising, since an alkali metal fluoride like lithium fluoride heated alone is essentially inert to the moisture of the air.

The phosphorus fluorides, and hydrogen fluoride if present, are evolved from the reaction mixture as a gas, and can readily be collected and recovered.

An illustrative embodiment of the invention, for example, is that represented by the equations $$3LiF + 3LiPO_3 \rightarrow POF_3 + 2Li_3PO_4$$
$$5LiF + 4LiPO_3 \rightarrow PF_5 + 3Li_3PO_4$$

representing two reactions which probably occur simultaneously, whereby phosphorus oxyfluoride and phosphorus pentafluoride are produced by the reaction of lithium fluoride with lithium metaphosphate. As will appear hereinafter, a phosphorus fluoride containing gas is also formed similarly starting with other phosphates within the above-defined class thereof, producing as a byproduct a phosphate less highly condensed than the initial phosphate, such as an orthophosphate, as illustrated, or another such phosphate.

When the fluoride-phosphate mixture is exposed to the moisture of air while it is heated, the evolution of hydrogen fluoride may occur as represented by the equation $$2LiF + H_2O \rightarrow Li_2O + 2HF$$

The alkali metal oxide so formed will react with condensed phosphate in the reaction mixture, again yielding a less condensed phosphate: for example, it will convert metaphosphate to orthophosphate as represented by the equation $$2Li_2O + 2LiPO_3 \rightarrow 2Li_3PO_4$$

The alkali metal fluorides and the alkali metal phosphates are readily available and inexpensive compounds, which can be handled with relative ease and facility. Accordingly, the reaction of these starting materials in accordance with this invention offers an economically attractive, low cost and convenient method of manufacture for a phosphorus fluoride containing gas.

Additionally, the process involved in the stated reaction can be utilized as a convenient method for the removal of unwanted fluorine and unwanted phosphorus from high temperature melts. For example where unwanted fluorine is present in a melt such as a glass, enamel or weldment slag, by introducing alkali metal phosphate into the melt, the fluorine can be evolved from the melt as a volatile product, thereby decreasing the fluorine content of the melt to the desired extent. At elevated temperatures, the reaction of the alkali metal phosphate with the alkali metal fluoride can proceed to substantial completion, so as to produce nearly complete or complete removal thereby of fluorine from a melt.

The reaction stated hereinabove can also be used to reduce the phosphorus content of high temperature melts. Thus, for example, where an excessive phosphorus content is present in a melt such as a steel or iron melt, in welding operations, in steel manufacture and so forth, an alkali metal fluoride may be introduced into the melt to produce evolution of a phosphorus fluoride containing gas therefrom, and thus reduce the phosphorus content of the melt.

The process of the invention may also be used to generate a phosphorus fluoride in the presence of a material susceptible to fluorination. Thus, for example, the reaction mixture of alkali metal fluoride and alkali metal phosphate may be admixed with a substance to be fluorinated, such as carbon, and the reaction conducted so that the nascent phosphorus fluoride effects its fluorination within the reaction mixture.

In conducting the novel reaction provided by this invention, any of a wide variety of alkali metal fluorides and of alkali metal phosphates may be employed. The alkali metal fluoride, for example, may be lithium fluoride, sodium fluoride, potassium fluoride or even a fluoride of a higher atomic weight alkali metal like cesium, if desired. Ordinarily the fluorides of alkali metals having an atomic weight below about 40 will be preferred, in view of their ready availability. Lithium fluoride contains the highest weight percentage of fluorine per unit weight of all the alkali metal fluorides and is most preferred.

The presently useful alkali metal phosphates are the phosphates in which the ratio of alkali metal oxide to phosphorus pentoxide is equal to 2 or less. Expression of the composition of a phosphate as such a ratio, $M_2O/P_2O_5$ (where M is an alkali metal) is a conventional method of describing the analysis of a phosphate, as is well known in the art. The polyphosphates are the phosphates in which this ratio has a value which is above 1 and equal to or less than 2. When the $M_2O/P_2O_5$ ratio of a phosphate equals 2, the phosphate is a pyrophosphate: thus, $Li_4P_2O_7$, lithium pyrophosphate, may be expressed as $2Li_2O/P_2O_5$. This is equivalent to $Li_3PO_4$ (orthophosphate)$+xLiPO_3$(metaphosphate), where $x$ is 1. The other polyphosphates may be considered similarly, as consisting of $M_3PO_4+xMPO_3$, where M is an alkali metal. As $x$ increases, the polyphosphates approach the composition of a metaphosphate. When the $M_2O/P_2O_5$ ratio equals 1, the phosphate is a metaphosphate: thus, $LiPO_3$, lithium metaphosphate, contains $Li_2O$ and $P_2O_5$ in a ratio of 1:1. If the $M_2O/P_2O_5$ ratio is less than 1, the phosphate is an ultraphosphate, exemplary of which is $Li_2P_6O_{16}$:$2LiPO_3.2P_2O_5$, or $Li_2O/3P_2O_5$. The highly condensed phosphates like the metaphosphates and ultraphosphates are polymeric compounds which may take the form either of chains or of cyclic structures. It is to be understood in connection with molar ratios discussed herein that a "polymer" of a metaphosphate, for example, is equivalent to the number of mols. of monomeric units it contains; thus $Li_3P_3O_9$ is equivalent to $3LiPO_3$, and so forth.

As will be evident from the foregoing discussion, the presently useful alkali metal phosphates include pyrophosphates and more condensed polyphosphates, metaphosphates and ultraphosphates. The same remarks as made above in connection with the cations of the alkali metal fluorides apply to the alkali metal component of these phosphates. Useful polyphosphates may include, for example, sodium pyrophosphate, lithium pyrophosphate, potassium pyrophosphate, sodium tripolyphosphate, lithium tripolyphosphate, cesium tripolyphosphate, sodium tetrapolyphosphate, lithium tetrapolyphosphate, and so forth. Similarly, any of a wide variety of alkali metal metaphosphates like lithium metaphosphate, sodium metaphosphate, potassium metaphosphate and so forth, and ultraphosphates like $Li_3P_{10}O_{29}$ ($8LiPO_3.P_2O_5$), $Li_6P_8O_{23}$ ($6LiPO_3.P_2O_5$), $Na_6P_8O_{23}$ ($6NaPO_3.P_2O_5$), $Na_4P_6O_{10}$ ($4NaPO_3.P_2O_5$), $K_2P_4O_{11}$ ($2KPO_3.P_2O_5$), $Na_2P_6O_{16}$ ($2NaPO_3.2P_2O_5$), $Li_2P_6O_{16}$ ($2LiPO_3.2P_2O_5$), and so forth may be employed. Transitions between the phosphates are gradual, and mixtures of the various types of phosphates may be used. The metaphosphates are the preferred species of phosphate in the present connection, and lithium metaphosphate is particularly preferred, because of its high phosphorus content per unit weight.

The alkali metal cation of the alkali metal fluoride which is reacted with the phosphate may be the same as the alkali metal cation of the phosphate, or it may be different. Thus, for example, the method of this invention may be practiced by reacting various combinations of reactants such as the following:

| Fluoride | Phosphate |
| --- | --- |
| Lithium fluoride | Lithium pyrophosphate. |
| Do | Lithium tripolyphosphate. |
| Do | Lithium metaphosphate. |
| Do | a Lithium ultraphosphate. |
| Do | Sodium pyrophosphate. |
| Do | Sodium metaphosphate. |
| Do | Potassium metaphosphate. |
| Sodium fluoride | Sodium pyrophosphate. |
| Do | Sodium tripolyphosphate. |
| Do | Sodium tetrapolyphosphate. |
| Do | Sodium metaphosphate. |
| Do | a Sodium ultraphosphate. |
| Do | a Lithium ultraphosphate. |
| Do | Lithium metaphosphate. |
| Do | Lithium pyrophosphate. |
| Do | Potassium pyrophosphate. |
| Potassium fluoride | Do. |
| Do | Potassium metaphosphate. |
| Do | Lithium metaphosphate. |
| Do | Sodium metaphosphate. |
| Do | Sodium pyrophosphate. | and so forth.

The formation of phosphorus oxyfluoride and phosphorus pentafluoride by the reaction of an alkali metal fluoride and a metaphosphate, as shown in the equations stated above, consumes from three to five moles of the alkali metal fluoride to from three to four equivalents of alkali metal metaphosphate, when the metaphosphate is taken all the way up to the orthophosphate. It has been found, however, that the evolution of a phosphorus fluoride containing gas will occur when the ratio of the alkali metal phosphate to the alkali metal fluoride varies widely from the theoretical ratio, and regardless of whether the alkali metal phosphate is present in excess or whether the alkali metal fluoride is present in excess of the theoretically required amounts thereof. Accordingly, the method of the present invention is not limited to any particular molar ratio of the alkali metal fluoride and the alkali metal phosphate during their reaction. However, it will be understood that when the method of the present invention is utilized as a precedure for the manufacture of a phosphorus fluoride containing gas it will generally be advantageous to react the alkali metal fluoride with the alkali metal phosphate in proportions respectively adapted to secure maximum conversion of each to the phosphorus fluoride containing product. In this case, a ratio of alkali metal fluoride to alkali metal metaphosphate ranging from about 70:30 to about 30:70 mol-percent respectively may be advantageous, for example, in securing maximum conversions of the starting materials to a phosphorus fluoride. Practical considerations may sometimes dictate use of high metaphosphate to fluoride ratios, such as 70:30 to 90:10 mol-percent ratios, however.

It may sometimes be desired to recover the phosphorus compound resulting from the reaction. In this case the ratios of the reactants will require consideration. Any metaphosphate available in the reaction mixture in excess of that required to react with the fluoride can combine with a less condensed phosphate such as an orthophosphate formed by the reaction as shown in the stated equations. To the extent that such excess metaphosphate is present, then, the phosphate remaining in the mixture upon evolution of the phosphorus fluoride containing gas will be a combination of a metaphosphate and an orthophosphate, or in other words, a polyphosphate. Appropriate adjustment of the fluoride:metaphosphate ratio will accordingly enable the user to control the nature of the phosphate left behind by evolution of the F content of the mixture.

When the phosphate employed is a phosphate other than a metaphosphate, the reaction proceeds essentially similarly. A phosphorus fluoride containing gas is evolved, while the initial phosphate is converted to a less highly condensed phosphate. As in the case of the metaphosphate, the fluoride:phosphate ratio may be varied widely in conducting the reaction. When the phosphate formed by the reaction of a condensed phosphate as employed herein with a fluoride is more condensed than an orthophosphate, it may itself react with available alkali metal fluoride in turn. This for example, in the reaction forming phosphorus pentafluoride, an ultraphosphate may be taken up to an orthophosphate:

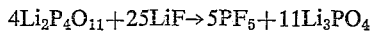
$$4Li_2P_4O_{11} + 25LiF \rightarrow 5PF_5 + 11Li_3PO_4$$

or with proportionately less fluoride, to polyphosphates:

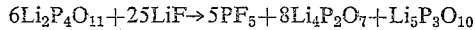
$$6Li_2P_4O_{11} + 25LiF \rightarrow 5PF_5 + 8Li_4P_2O_7 + Li_5P_3O_{10}$$

The reaction may also be conducted in the presence of such phosphates in excess of the maximum amount which will react with the alkali metal fluoride available in the reaction mixture.

In general, the process of what may be termed decondensation of the condensed polyphosphates may be regarded as proceeding as follows, in the formation of phosphorus oxyfluoride

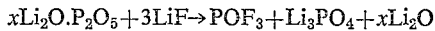
$$xLi_2O.P_2O_5 + 3LiF \rightarrow POF_3 + Li_3PO_4 + xLi_2O$$

and as follows in the formation of phosphorus pentafluoride

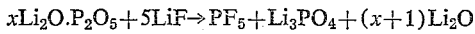
$$xLi_2O.P_2O_5 + 5LiF \rightarrow PF_5 + Li_3PO_4 + (x+1)Li_2O$$

where $x=2$ or less. The extra $Li_2O$ is available to decondense other condensed phosphate, as for example in accordance with the equation

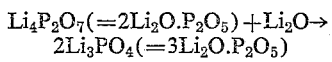
$$Li_4P_2O_7 (=2Li_2O.P_2O_5) + Li_2O \rightarrow 2Li_3PO_4 (=3Li_2O.P_2O_5)$$

As stated above, it has further been discovered that when an alkali metal fluoride like lithium fluoride is heated with a condensed phosphate in accordance with this invention in the presence of atmospheric moisture, it is found that the evolution of fluorine is increased as compared with that in a dry atmosphere. Such loss of fluorine does not occur when the alkali metal fluoride is heated under similar conditions alone or in the presence of a phosphate not subject to decondensation such as an orthophosphate. Apparently the fluorine in the alkali metal fluoride becomes liable to hydrolysis because of the acidic nature of the condensed phosphate. The fluoride acts as a high temperature base and the condensed phosphate, as a high temperature acid in the reaction of this invention. In the stated hydrolysis, which may be represented by the equation

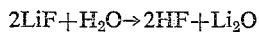
$$2LiF + H_2O \rightarrow 2HF + Li_2O$$

lithium oxide is also released and made available to effect decondensation of condensed phosphate in the reaction mixture. Thus the presently provided reaction may advantageously be conducted in the presence of atmospheric moisture especially when maximum effectiveness in removal of fluorine and/or decondensation of a condensed phosphate (as distinguished from maximum formation of a gaseous phosphorus fluoride) is the desired result.

Where the method of this invention is practiced to reduce the phosphorus or the fluorine content respectively of high temperature melts, this will be done by introducing the appropriate reactant, comprising either a phosphate or a fluoride, into the melt. By a high temperature melt is meant a melt which can be heated to the temperatures required to effect formation of one or more phosphorus fluorides by the reaction of the present process without undue decomposition or undesired changes in composition. Generally such melts will be inorganic. They may, for example, be largely metallic, such as an iron or steel melt or a welding melt. They may comprise inorganic compounds, such as a glass or enamel melt or a weldment slag. In any case, the melt will contain one of the above-discussed reactants, or an equivalent thereof. Thus, where the melt is to be treated to remove phosphorus, it should contain one of the phosphates of the types stated hereinabove, with an $M_2O/P_2O_5$ ratio of 2 or less. When the present novel process is practiced to remove fluorine, the ionic fluorine which may be removed may include not only fluorine present in the form of discrete negative ions, but also fluorine included in another ion like the $PO_3F$ ion. As will be understood, where the intended result is the reduction of the fluorine content of the melt, the reactant to be introduced into the melt will comprise an alkali metal phosphate. The selected alkali metal phosphate may be any of the alkali metal phosphates mentioned hereinabove, such as lithium metaphosphate, sodium metaphosphate, potassium metaphosphate, lithium pyrophosphate, sodium pyrophosphate, lithium tripolyphosphate, lithium tetrapolyphosphate, sodium tripolyphosphate, a lithium ultraphosphate, and so forth, with the metaphosphates, especially lithium metaphosphate, being particularly preferred. On the other hand, where the problem is removal of unwanted phosphorus from a melt, the reactant which will be introduced into the melt to induce the occurrence of the reaction of this invention, whereby a phosphorus fluoride containing gas is formed, will be an alkali metal fluoride. Again this alkali metal fluoride may be any of the alkali metal fluorides mentioned hereinabove, such as lithium fluoride, sodium fluoride or potassium fluoride. The amount of alkali metal phosphate or alkali metal fluoride introduced into the melt to be treated for the removal of unwanted fluorine or phosphorus, respectively, will be proportioned to the amount of fluorine or phosphorus present in the melt, generally, where maximum removal of the unwanted element is desired. Thus where the melt to be treated contains a fluorine compound such as sodium fluoride, to secure maximum removal of fluorine from the melt, at least three moles of alkali metal metaphosphate will be introduced into the melt for each three moles of alkali metal fluoride which it contains. Conversely, where the melt contains a higher phosphorus content than desired, it will be treated with at least three moles of alkali metal fluoride for each three moles of phosphate present therein. Ordinarily the efficiency of removal of the unwanted element from the melt to be treated will be maximized by introduction of an excess of the reactant with which it is treated to secure evolution of the phosphorus fluoride containing gas therefrom, and for this purpose the amount of alkali metal fluoride or alkali metal phosphate, respectively, introduced into the melt may, where desired, amount to a substantial excess over the theoretical molar equivalent of the amount of unwanted compound present in the melt. Generally a 10 times molar excess will be the maximum amount of reagent which can be introduced economically, but if desired the proportion may exceed this. As mentioned above, it is also found that the reaction of an alkali metal fluoride with an alkali metal phosphate occurs when either of the reactants is present in less than the theoretically required ratio, and where, for example, it is desired to secure partial but not complete removal of an unwanted element selected from phosphorus and fluorine from a melt, this may be secured by introducing an appropriate amount of the treating agent into the melt. As will be appreciated from a consideration of the equations stated above, only partial removal of the total phosphorus content of a phosphate can be secured by the present process. However, it is nevertheless adapted to reduce the phosphorus content of a melt, and may be employed to advantage where partial reduction thereof is desired. As to fluorine removal, up to 100% of the fluorine may be removed from the melt by the reactions illustrated by the above equations, if carried to completion.

The temperature at which the reaction of the alkali metal fluoride with the alkali metal phosphate to form the phosphorus fluoride containing gas occurs is relatively elevated. In conducting the reaction of the two components, lithium fluoride and lithium metaphosphate, it has been found that substantially complete conversion of the fluorine content of the reaction mixture to a phosphorus fluoride containing gas may be achieved when a melt of the reactants is heated to 900° C. for 24 hours. Variation in the ratios of the reactants, in the nature of the reactants, as for example where the reactants comprise sodium fluoride and lithium metaphosphate or sodium fluoride and sodium metaphosphate and so forth, as well as introduction of a reaction medium, will of course affect the optimum temperature for achieving maximum reaction. In general, the present invention includes conducting the reaction at any temperature at which the reaction components will react at a measurable rate. Phosphorus oxyfluoride and phosphorus pentafluoride each boil at below 0°, so that they will ordinarily be evolved from the reaction mixture at any temperature at which their formation occurs. Ordinarily, to achieve an appreciable reaction rate it will be necessary to heat the reaction mixture to above the melting temperature of the mixture, or at least above the melting temperature of one of the components thereof. In appropriate proportions, the alkali metal fluoride and the alkali metal phosphate utilized may form a eutectic having a lower melting point than either of the two components individually. Thus for example, lithium fluoride melts at 870° C., and lithium metaphosphate, at 656° C., but their eutectic melts at 550° C. Usually to achieve melting of the several components taking part in the reaction, it will be necessary to utilize a temperature of at least about 500° C. Where a melt is formed and the reaction producing a phosphorus fluoride containing gas does begin to occur at a lower temperature, such temperatures will be operable in conducting the novel method of this invention. Ordinarily relatively high temperatures, in the range of from about 800° to about 1000° C., will be preferred. Usually the temperature will be maintained below the decomposition temperature of the reactants and below the boiling temperature of the reactants involved in the reaction mixture from which the evolution of the phosphorus fluoride is occurring. Where the method of this invention is practiced for the removal of unwanted fluorine and/or phosphorus from a high temperature melt, the melt being treated to remove unwanted fluorine, phosphorus or both therefrom will form the medium for the reaction, and the reaction will be carried out at above the melting temperature of this melt.

The time during which the melt wherein the process of this invention is occurring will be held at reaction temperature will be sufficient to produce a substantial decrease in the combined weight of the fluoride and phosphate reactants in the reaction mixture, by evolution of the phosphorus fluoride containing gas therefrom. At the elevated temperatures herein employed, it is found that heating the alkali metal fluorides and phosphates individually may produce a certain weight loss, the extent of which varies with the individual compound. Heating may accordingly, for example, produce a substantial weight loss from a reaction component present in excess of the theoretical equivalent of the other reactants, which weight loss is not due to evolution of a phosphorus fluoride. Due allowance must be made for this in calculating the weight loss of the reaction mixture which is due to phosphorus fluoride evolution. In effectuating the process of this invention, the latter weight loss will be substantial, amounting to at least about 2%. The reaction may, if desired, be so conducted as to approach or reach the theoretical weight loss, which is approximately ten to twenty-five times the stated 2% loss, for example, for the reaction of $NaPO_3$ with $NaF$ to form respectively, phosphorus pentafluoride or oxyfluoride and sodium orthophosphate. The time required to complete the reaction will generally vary with the reaction temperature and reactivity of the reaction components and their concentrations. In accordance with this invention, the reaction mixture will generally be held at the reaction temperature for at least about one hour. When the method of this invention is practiced to remove unwanted P and/or F from a high temperature melt, the melt will be held at reaction temperature for a time at least sufficient to remove the desired quantity of P and/or F therefrom. Where desired, the time of heating may be extended or decreased to control the extent of removal achieved. Of course, where a high temperature melt is treated, and also where the invention is practiced to fluorinate a material, like carbon, admixed with the reaction mixture, there may not be any substantial weight loss of the total reaction mixture. However, there will be a substantial weight loss with respect to the combined weight of the phosphate and fluoride reactants in the mixture, by evolution of one or more phosphorus fluorides therefrom, just as where the reaction mixture consists essentially of these reactants.

The phosphorus fluoride or fluoride product will be evolved as a gas from reaction mixtures in which the novel method of this invention is practiced. Where the reaction is conducted for the purpose of manufacturing a phosphorus fluoride containing gas suitable arrangements will be made for the recovery of the phosphorus fluoride containing gas, as for example by freezing the gas in a cylinder. Where the reaction is being conducted to remove unwanted F or P from a melt, the evolved gas may if desired be collected, but will usually simply be vented from the reaction vessel with suitable precautions.

In practicing the present method for the production of fluorinated carbonaceous materials, the elemental carbon used may comprise graphite, charcoal, a coal such as an anthracite or bituminous coal, carbon black, activated carbon or the like. In this embodiment of the invention, undesired reactions of the reaction products will be avoided by exclusion of air. In an illustrative operation, for example, an intimate mixture composed of 110 parts by weight of lithium fluoride, 292 parts by weight of lithium metaphosphate and 6.96 parts by weight of finely-divided elemental carbon is placed in a platinum tube which is inserted in a heat-resistant glass tube. The latter has an inlet through which a steady slow stream of nitrogen gas is introduced, and an outlet tube connected to a cold trap cooled with liquid nitrogen. Waste gas not condensing in the cold trap vents through a drying tube to the atmosphere. An electric combustion furnace enclosing the glass tube heats the reaction mixture therein to a temperature of 900° C. Fluorinated carbonaceous products such as carbon tetrafluoride, tetrafluoroethylene or the like may be collected in the cold trap.

Practice of the method of this invention to effect the elimination of an unwanted element will generally be conducted in a vessel open to the air, since in this case, the presence of HF in the gaseous reaction product is immaterial. This embodiment of the present invention includes, among other examples of treatment of a high-temperature melt to remove an unwanted element, the conversion of an alkali metal phosphate of the kind susceptible to the present reaction to a less condensed phosphate. For example, lithium metaphosphate may be converted to lithium pyrophosphate employing the process of this invention to remove phosphorus. The ratio of $Li_2O$ to $P_2O_5$, which is 1 in the metaphosphate, is converted to a ratio of 2, corresponding to a pyrophosphate, in accordance with the equations $$5LiPO_3+3LiF \rightarrow 2Li_4P_2O_7+POF_3$$
$$7LiPO_3+5LiF \rightarrow 3Li_4P_2O_7+PF_5$$
$$2LiF+H_2O \rightarrow 2HF+Li_2O; \quad 2LiPO_3+Li_2O \rightarrow Li_4P_2O_7$$

As will be appreciated, where the phosphorus fluoride containing gas formed as discovered in accordance with this invention is recovered, the phosphate-containing reaction mixture from which phosphorus fluoride containing gas has been evolved can also be recovered for further use. The nature of this recoverable reaction mixture will vary, depending on the nature of the initial phosphate and its ratio to the fluoride in the reaction mixture. As shown by the equations $$3LiPO_3+3LiF \rightarrow POF_3+2Li_3PO_4$$
$$4LiPO_3+5LiF \rightarrow PF_5+3Li_3PO_4$$

at the theoretical ratio of reactants using a metaphosphate, the product is an orthophosphate. It has been mentioned above that any metaphosphate present in the reaction mixture in excess of that undergoing reaction with the fluoride may combine with such orthophosphate to produce a polyphosphate, such as the pyrophosphate. At higher ratios, the metaphosphate can form a more condensed polyphosphate, such as tripolyphosphate:

$$6LiPO_3+3Li_3PO_4 \rightarrow 3Li_5P_3O_{10}$$

When the initial phosphate is a polyphosphate, by considering the polyphosphate as a combination of an orthophosphate and metaphosphate, it will readily be evident that its reaction with the fluoride converts it to orthophosphate. The ultraphosphates can be converted to any less condensed phosphate up to the orthophosphate, the identity thereof depending on the composition of the initial phosphate and its ratio to fluoride in the reaction mixture. Phosphates less condensed than the ultraphosphate include metaphosphates and polyphosphates. Since the later alkali metal phosphates are reactive with alkali metal fluorides as comprised by the process of this invention, where the fluoride is present in excess of the theoretical, it may react with the stated alkali metal phosphates to convert them in turn to still less condensed phosphates, until all of the available phosphate has been taken up to the alkali metal orthophosphate. Thus the nature of the phosphate product may be controlled as desired.

The invention is further illustrated but not limited by the following examples.

EXAMPLE I

A mixture of 55.56 mol-percent LiF and 44.44 mol-percent $LiPO_3$ (27.397 wt.-percent LiF, 72.603 wt.-percent $LiPO_3$) is prepared having an initial total weight of 9.9808 grams. This mixture is heated in air at 900° C. for 24 hours. The sample weight at the end of the heating period is 8.2178 g., a weight loss of 1.7630 g. While being heated the reaction mixture evolves a gas which fumes on contact with air.

The pure components, LiF and $LiPO_3$ exhibit great thermal stability at the temperature of heating. Thus, a 10.2457 g. sample of LiF heated for 48 hours at 900° C. loses only 0.0280 g. weight, and similarly, heating 10.0992 g. of $LiPO_3$ at 900° C. for 48 hours produces a weight loss of only 0.0518 g., in air.

EXAMPLE II

Mixtures of LiF and $LiPO_3$ varying from 90 mol-percent LiF/10 mol-percent $LiPO_3$ to 10 mol-percent LiF/90 mol-percent $LiPO_3$ are prepared, weighed, heated in air at 900° C. for 24 hours, and reweighed.

The data, presented in the following table, show that the molten salt mixtures lose appreciable weight while being heated, indicating the occurrence of an interaction between LiF and $LiPO_3$, at each of the varying ratios.

*Table I.—Weight Losses for Mixtures of LiF and $LiPO_3$ Heated at 900° C. for 24 Hours*

| Mole, Percent LiF | Mole, Percent $LiPO_3$ | Weight, Percent LiF | Weight, Percent $LiPO_3$ | Sample Wt. at Start, g. | Sample Wt. at End, g. | Weight Loss, g. |
|---|---|---|---|---|---|---|
| 90 | 10 | 73.097 | 26.903 | 9.9914 | 9.0816 | 0.9098 |
| 80 | 20 | 54.702 | 45.298 | 9.9682 | 8.4132 | 1.555 |
| 70 | 30 | 41.325 | 58.675 | 9.9886 | 7.7313 | 2.2573 |
| 60 | 40 | 31.172 | 68.828 | 9.9897 | 7.9065 | 2.0832 |
| 50 | 50 | 23.188 | 76.811 | 9.9861 | 8.3396 | 1.6465 |
| 40 | 60 | 16.757 | 83.243 | 9.9915 | 8.5583 | 1.4332 |
| 30 | 70 | 11.457 | 88.543 | 9.9912 | 8.9232 | 1.0680 |
| 20 | 80 | 7.018 | 92.982 | 9.9965 | 9.3383 | 0.6582 |
| 10 | 90 | 3.245 | 96.756 | 9.9937 | 9.7318 | 0.2619 |

X-ray diffraction patterns of the fired reaction mixtures show a diminution in the quantities of LiF and $LiPO_3$ present, accompanied by augmentation in the line intensity attributable to $Li_3PO_4$.

These X-ray diffraction patterns for mixtures rich in LiF show that the $Li_3PO_4$ product and the excess LiF coexist at the end of the experiment, demonstrating that LiF and $Li_3PO_4$ are essentially nonreactive at high temperatures.

EXAMPLE III

Chemical analyses are made of reaction mixtures containing respectively:

(A) 30 mol-percent LiF, 70 mol-percent $LiPO_3$
(B) 20 mol-percent LiF, 80 mol-percent $LiPO_3$
(C) 10 mol-percent LiF, 90 mol-percent $LiPO_3$ before and after heating the reaction mixtures as stated in Example II in air at 900° C. for 24 hours. The data obtained are as follows:

*Table II.—Phosphorus and Fluorine Losses*

| P at Start, g. | P at End, g. | P Lost, g. | F at Start, g. | F at End, g. | F Lost, g. | F/P Mole Ratio Loss |
|---|---|---|---|---|---|---|
| A. 3.1893 | 2.9759 | 0.2139 | 0.8385 | 0.0384 | 0.8001 | 6.10 |
| B. 3.3514 | 3.2198 | 0.1316 | 0.5138 | 0.0308 | 0.4830 | 5.99 |
| C. 3.4865 | 3.4256 | 0.0609 | 0.2376 | 0.0428 | 0.1948 | 5.21 |

EXAMPLE IV

A mixture of 50 mole-percent LiF and 50 mole-percent $LiPO_3$ is prepared and divided into samples of series designated respectively as 1 and 2.

The samples of series 1 are protected from access of air and heated at 900° C. while dry argon, free of water vapor, is passed over the mixture.

The samples of series 2 are treated identically except that the gas passed over these samples while they are heated is argon saturated with water vapor at room temperature.

The effluent gases from series 1 and 2 are each absorbed on dilute sodium hydroxide solution, and analyzed for fluorine and phosphorus content to determine the F/P ratio.

For three runs made as described for series 1, the F/P ratios are, respectively, 3.37, 3.40, and 3.26.

For the wet runs of series 2, the F/P ratios are 4.36 and 5.21.

That the dry runs of series 1 give F/P ratio values above 3 indicates that the gaseous product is a mixture of $POF_3$, in which this ratio is 3, with $PF_5$, in which this ratio is 5.

That the wet runs of series 2 give higher F/P ratios shows that exposure to moisture significantly increases fluorine liberation, which is to be attributed to hydrolysis of the metal fluoride in the presence of the condensed phosphates.

EXAMPLE V

A sample of sodium metaphosphate weighing 11.6494 g. is heated for 16 hours in air at 900° C. It undergoes a weight loss of 0.0040 g.

A sample of sodium fluoride weighing 6.6957 g. is heated for 16 hours in air at 900° C. It exhibits a weight loss of 0.0302 g.

A mixture of 4.0632 g. NaF and 7.8944 g. NaPO₃ loses 1.0361 g. of weight upon heating in air for 16 hours at 900° C. During the heating, a phosphorus fluoride containing gas is evolved, which fumes upon contact with air.

A phosphorus fluoride containing gas is evolved similarly upon heating a mixture of sodium fluoride with lithium metaphosphate, and upon heating a mixture of lithium fluoride with sodium metaphosphate, at temperatures at which the mixtures are molten.

EXAMPLE VI

Samples comprising 10.1540 g. $KPO_3$ and 6.7210 g. KF heated individually at 900° C. in air for 16 hours lose 0.0030 g. and 0.4046 g., respectively.

When a mixture of 10.2857 g. $KPO_3$ and 6.3164 g. KF is subjected to an elevated temperature in the same manner, the weight loss is 1.3955 g., and a phosphorus fluoride containing gas is evolved.

The evolution of a phosphorus fluoride containing gas and the occurrence of a weight loss substantially exceeding that of the individual reactants under the same conditions similarly occurs when a mixture of sodium pyrophosphate and sodium fluoride, and a mixture of a lithium ultraphosphate of the composition $Li_2P_4O_{11}$ and lithium fluoride are respectively held at temperatures above the melting points of the mixtures.

While the invention has been illustrated with reference to various specific embodiments thereof, it is to be appreciated that modifications and variations can be made within the scope of the invention as defined in the appended claims.

This application is a continuation-in-part of my copending application Serial Number 36,475, filed June 16, 1960, now abandoned.

What is claimed is:

1. The method of producing a phosphorus fluoride containing gas which comprises heating an alkali metal fluoride with an alkali metal phosphate having an alkali metal oxide to phosphorus pentoxide ratio of up to 2 at a temperature and for a time sufficient to produce a substantial decrease in the combined weight of said fluoride and said phosphate in the reaction mixture by evolution of a phosphorus fluoride containing gas therefrom.

2. The method of claim 1 in which said phosphate is a metaphosphate.

3. The method of obtaining a phosphorus fluoride containing gas which comprises heating an alkali metal fluoride with an alkali metal phosphate having an alkali metal oxide to phosphorus pentoxide ratio of up to 2 at a temperature and for a time sufficient to produce a substantial decrease in the combined weight of said fluoride and said phosphate in the reaction mixture and recovering a phosphorus fluoride containing gas evolved thereby from the reaction mixture.

4. The method of obtaining a phosphorus fluoride containing gas which comprises heating a mixture of lithium fluoride and lithium metaphosphate to a temperature of about 900° C. for a period of time sufficient to produce a substantial decrease in the combined weight of said fluoride and said phosphate in the reaction mixture, and recovering a phosphorus fluoride containing gas evolved thereby from the reaction mixture.

5. In the method of fluorinating elemental carbon with a phosphorus fluoride containing gas the improvement comprising, heating a mixture of:
(1) an alkali metal fluoride,
(2) an alkali metal phosphate, said phosphate having an alkali metal oxide to phosphorus pentoxide ratio of up to 2, and
(3) elemental carbon,
at a temperature and for a time sufficient to produce a substantial decrease in the combined weight of said alkali metal fluoride and said alkali metal phosphate in the reaction mixture, by evolution of a phosphorus fluoride containing gas therefrom.

6. The method of removing unwanted fluorine from a melt containing fluorine which comprises introducing an alkali metal phosphate having an alkali metal oxide to phosphorus pentoxide ratio of up to 2 into a melt containing a metal fluoride, heating said melt at at temperature and for a time sufficient to produce a substantial decrease in the combined weight of said fluoride and said phosphate in the reaction mixture by evolution of a phosphorus fluoride containing gas therefrom, and removing said phosphorus fluoride containing gas from said melt.

7. The method of removing unwanted phosphorus from a melt containing phosphorus which comprises introducing an alkali metal fluoride into a melt containing an alkali metal phosphate having an alkali metal oxide to phosphorus pentoxide ratio of up to 2, heating said melt at a temperature and for a time sufficient to produce a substantial decrease in the combined weight of said fluoride and said phosphate in the reaction mixture by evolution of a phosphorus fluoride containing gas therefrom, and removing said phosphorus fluoride containing gas from said melt.

References Cited in the file of this patent

UNITED STATES PATENTS

| | | |
|---|---|---|
| 2,510,155 | Tanczyn | June 6, 1950 |
| 2,709,186 | Farlow et al. | May 24, 1955 |

FOREIGN PATENTS

| | | |
|---|---|---|
| 814,139 | Germany | Sept. 20, 1951 |